(12) United States Patent
Lehman

(10) Patent No.: US 6,914,701 B2
(45) Date of Patent: Jul. 5, 2005

(54) DIGITIZER WITH IMPROVED DYNAMIC RANGE AND PHOTOMETRIC RESOLUTION

(75) Inventor: Richard Lehman, Nashua, NH (US)

(73) Assignee: Howtek Devices Corporation, Hudson, NH (US)

( * ) Notice: Subject to any disclaimer, the term of this patent is extended or adjusted under 35 U.S.C. 154(b) by 179 days.

(21) Appl. No.: 10/313,764

(22) Filed: Dec. 6, 2002

(65) Prior Publication Data

US 2004/0109206 A1 Jun. 10, 2004

(51) Int. Cl.[7] .............. H04N 1/40; H04N 1/04; H04N 1/38; H03M 1/12
(52) U.S. Cl. ............ 358/445; 358/487; 358/443; 358/448; 358/463; 358/482; 358/483; 358/506; 358/444; 358/475; 358/513; 358/514; 358/523; 341/155; 341/156; 341/172
(58) Field of Search ................ 358/487, 506, 358/445, 443, 463, 448, 444, 475, 513, 523, 446, 509, 497, 494, 496, 498, 483, 482; 341/155, 156, 172, 139–141; 382/274, 275, 312, 318, 319; 250/208.1, 234–236

(56) References Cited

U.S. PATENT DOCUMENTS

| | | | |
|---|---|---|---|
| 3,952,290 A | 4/1976 | Williams | 365/127 |
| 4,314,281 A | 2/1982 | Wiggins et al. | 358/406 |
| 4,396,903 A | 8/1983 | Habicht et al. | 382/103 |
| 4,408,231 A | 10/1983 | Bushaw et al. | 358/406 |
| 4,439,788 A | 3/1984 | Frame | 348/262 |
| 4,485,405 A | 11/1984 | Bailey | 358/230.1 |
| 4,540,901 A | 9/1985 | Suzuki | 327/515 |
| 4,647,975 A | 3/1987 | Alston et al. | 348/222.1 |
| 4,654,713 A | 3/1987 | Boucharlat et al. | 348/295 |
| 4,665,440 A | 5/1987 | Tromborg | 348/316 |
| 4,670,787 A | 6/1987 | Levine | 348/602 |
| 4,691,237 A | 9/1987 | Shimizu | 358/409 |
| 4,772,958 A | 9/1988 | Suzuki | 358/464 |
| 4,878,119 A | 10/1989 | Beikirch et al. | 358/471 |
| 4,884,224 A | 11/1989 | Hirosawa | 382/242 |
| 4,992,653 A | 2/1991 | Kawahara et al. | 250/208.1 |
| 5,034,825 A | 7/1991 | Ejiri et al. | 358/475 |
| 5,093,734 A | 3/1992 | Gerlach | 358/474 |
| 5,099,359 A | 3/1992 | Hrycin et al. | 359/587 |
| 5,101,108 A | 3/1992 | Gaalema et al. | 250/332 |
| 5,192,856 A | 3/1993 | Schaham | 235/462.24 |
| 5,218,485 A | 6/1993 | Malm | 359/885 |
| 5,221,848 A | 6/1993 | Milch | 250/559.02 |
| 5,241,404 A | 8/1993 | Furukawa et al. | 358/466 |
| 5,251,406 A | 10/1993 | Kirn | 358/487 |
| 5,252,818 A | 10/1993 | Gerlach et al. | 250/208.1 |
| 5,268,567 A | 12/1993 | Bowlby, Jr. et al. | 250/208.1 |
| 5,343,308 A | 8/1994 | Johnson | 358/445 |
| 5,410,144 A | 4/1995 | Lavelle et al. | 250/208.1 |
| 5,416,611 A | 5/1995 | Tandon | 358/474 |
| 5,422,643 A | 6/1995 | Chu et al. | 341/141 |
| 5,682,033 A | 10/1997 | Cattorini | 250/208.1 |
| 5,955,725 A | 9/1999 | Cattorini | 250/208.1 |
| 6,271,940 B1 * | 8/2001 | Deschuytere et al. | 358/504 |
| 6,404,516 B1 * | 6/2002 | Edgar | 358/487 |

\* cited by examiner

Primary Examiner—Cheukfan Lee
(74) Attorney, Agent, or Firm—Grossman Tucker Perreault & Pfleger, PLLC

(57) ABSTRACT

A digitizer having a dual exposure technique is combined with an associated LUT for each exposure. Each LUT may have a transfer function including a logarithmic operator resulting in a digitized image with improved photometric resolution and increased dynamic range. A digitizer utilizing multiple exposures at approximately equal exposure time intervals provides a noise reduction for lower optical density portions of the data medium further contributing to increased dynamic range. Associated methods are also provided.

14 Claims, 3 Drawing Sheets

FIG. 2A
1X EXPOSURE

200A

| TRANS. | OD | VOLTAGE | 16-BIT LINEAR COUNTS |
|---|---|---|---|
| 1 | 0.00 | 2.000 | 64,000 |
| 0.7 | 0.15 | 1.400 | 44,800 |
| 0.5 | 0.30 | 1.000 | 32,000 |
| 0.3 | 0.52 | 0.600 | 19,200 |
| 0.1 | 1.00 | 0.200 | 6,400 |
| 0.05 | 1.30 | 0.100 | 3,200 |
| 0.03 | 1.52 | 0.060 | 1,920 |
| 0.02 | 1.70 | 0.040 | 1,280 |
| 0.01 | 2.00 | 0.020 | 640 |
| 0.008 | 2.10 | 0.016 | 512 |
| 0.006 | 2.22 | 0.012 | 384 |
| 0.004 | 2.40 | 0.008 | 256 |
| 0.001 | 3.00 | 0.002 | 64 |
| 0.0008 | 3.10 | 0.002 | 51 |
| 0.0006 | 3.22 | 0.001 | 38 |
| 0.0004 | 3.40 | 0.001 | 26 |
| 0.0001 | 4.00 | 0.000 | 6 |

FIG. 2B
20X EXPOSURE

200B

| TRANS. | OD | VOLTAGE | 16-BIT LINEAR COUNTS | |
|---|---|---|---|---|
| 1 | 0.00 | 2.000 | 64,000 | |
| 0.7 | 0.15 | 2.000 | 64,000 | |
| 0.5 | 0.30 | 2.000 | 64,000 | |
| 0.3 | 0.52 | 2.000 | 64,000 | SATURATION |
| 0.1 | 1.00 | 2.000 | 64,000 | |
| 0.05 | 1.30 | 2.000 | 64,000 | |
| 0.03 | 1.52 | 1.200 | 38,400 | |
| 0.02 | 1.70 | 0.800 | 25,600 | |
| 0.01 | 2.00 | 0.400 | 12,800 | |
| 0.008 | 2.10 | 0.320 | 10,240 | |
| 0.006 | 2.22 | 0.240 | 7,680 | |
| 0.004 | 2.40 | 0.160 | 5,120 | |
| 0.001 | 3.00 | 0.040 | 1,280 | |
| 0.0008 | 3.10 | 0.032 | 1,024 | |
| 0.0006 | 3.22 | 0.024 | 768 | |
| 0.0004 | 3.40 | 0.016 | 512 | |
| 0.0001 | 4.00 | 0.004 | 128 | |

FIG. 3A

1X EXPOSURE
LINEAR TO LOG LUT

| TRANS. | OD | 16-BIT LINEAR INPUT | 12-BIT LOG OUTPUT |
|---|---|---|---|
| 1 | 0.00 | 64,000 | 4,000 |
| 0.7 | 0.15 | 44,800 | 3,845 |
| 0.5 | 0.30 | 32,000 | 3,699 |
| 0.3 | 0.52 | 19,200 | 3,477 |
| 0.1 | 1.00 | 6,400 | 3,000 |
| 0.05 | 1.30 | 3,200 | 2,699 |

FIG. 3B

20X EXPOSURE
LINEAR TO LOG LUT

| TRANS. | OD | 16-BIT LINEAR INPUT | 12-BIT LOG OUTPUT |
|---|---|---|---|
| 0.03 | 1.52 | 38,400 | 2,477 |
| 0.02 | 1.70 | 25,600 | 2,301 |
| 0.01 | 2.00 | 12,800 | 2,000 |
| 0.008 | 2.10 | 10,240 | 1,903 |
| 0.006 | 2.22 | 7,680 | 1,778 |
| 0.004 | 2.40 | 5,120 | 1,602 |
| 0.001 | 3.00 | 1,280 | 1,000 |
| 0.0008 | 3.10 | 1,024 | 903 |
| 0.0006 | 3.22 | 768 | 778 |
| 0.0004 | 3.40 | 512 | 602 |
| 0.0001 | 4.00 | 128 | 0 |

DIGITIZER WITH IMPROVED DYNAMIC RANGE AND PHOTOMETRIC RESOLUTION

FIELD OF THE INVENTION

The present invention relates generally to a digitizer and in particular to a digitizer with improved dynamic range and photometric resolution.

BACKGROUND OF THE INVENTION

In general, digitizers convert images on various media to an electric signal which can then be stored, transferred, or analyzed in any number of ways. The image captured on the media can be described by a two-dimensional array of picture elements or pixels quantified in terms of the transmittance or optical density of the medium at the particular coordinates of the pixels.

A medium that has regions of high optical density (low transmittance) and low optical density (high transmittance) requires a digitizer capable of accurately reading such image data. Some media, e.g., transparent media such as X-ray films, have images with such a wide range of optical densities. One way of measuring the performance of a digitizer system to capture such a wide range of image data is its dynamic range. Dynamic range is generally defined as the ratio of the maximum output signal of a light detector of the digitizer when illuminated with light and the noise output in the absence of light. It is typically expressed as the Log (White signal/RMS noise). Any reduction in noise would therefore serve to effectively increase the dynamic range of the digitizer.

Accordingly, there is a need in the art for a digitizer capable of reducing noise and therefore improving dynamic range, as well as increasing the photometric resolution of a digitized image.

BRIEF SUMMARY OF THE INVENTION

A digitizer for digitizing an image on a data medium consistent with the invention includes: a light sensitive element configured to be responsive to a light beam from an illuminator during a first exposure and during a second exposure, the first exposure associated with a first range of optical densities and the second exposure associated with a second range of optical densities of the image, the light sensitive element configured to produce a first set of analog signals associated with the first exposure and a second set of analog signals associated with the second exposure; an analog to digital converter configured to convert the first set of analog signals to a first set of digital signals and the second set of analog signals to a second set of digital signals; and a machine-readable medium includes a first look up table and a second look up table. The first look up table is configured to map the first set of digital signals to a first set of output signals associated with the first range of optical densities, and the second look up table is configured to map the second set of digital signals to a second set of output signals associated with the second range of optical densities.

According to another aspect of the invention, there is provided a digitizer with noise reduction for low density images including: an illuminator configured to generate a light beam to illuminate a data medium; a light sensitive element configured to be sensitive to the light beam for a plurality of approximately equal time intervals, the light sensitive element further configured to accept the light beam and convert the light beam into sets of analog signals associated with each of the plurality of time intervals representing data recorded on a data medium; an analog to digital converter configured to convert each set of analog signals to an associated set of digital signals, wherein each of set digital signals has an associated noise level; and a processor configured to average each set of digital signals into an average digital signal having count values, the average digital signal having a second noise level, the second noise level less than each associated noise level for each set of digital signals.

According to a further aspect of the invention, there is provided a method of presenting data from a dual exposure technique in a digitizer including the steps of: exposing a data medium to a first exposure associated with a first range of optical densities and to a second exposure associated with a second range of optical densities; accumulating a first set of analog charges associated with the first exposure and a second set of analog charges associated with the second exposure; converting the first set of analog charges to a first set of digital signals and converting the second set of analog charges to a second set of signals; and mapping the first set of digital signals to a first set of output signals and the second set of digital signals to a second set of output signals.

According to a further aspect of the invention, there is provided a method of improving photometric resolution from a dual exposure technique in a digitizer including the steps of: exposing a data medium to a light beam for a first exposure time interval; accumulating a first set of analog charges associated with the first exposure time interval; exposing the data medium to the light beam for a second exposure time interval, wherein the second exposure time interval is greater than the first exposure time interval by a multiplication factor n; accumulating a second set of analog charges associated with the second exposure time interval; converting the first set of analog charges to a first set of linear digital count values and converting the second set of analog charges to a second set of linear digital count values; mapping the first set of linear digital count values corresponding to portions of the data medium having an optical density less than or equal to Log n to a first set of logarithmic digital count values; and mapping the second set of linear digital count values corresponding to portions of the data medium having an optical density greater than Log n to a second set of logarithmic digital count values.

According to yet a further aspect of the invention, there is provided a method of reducing noise for low optical density portions of a data medium including the steps of: exposing the data medium to a light beam for a plurality of substantially equal exposure time intervals; accumulating a set of analog charges associated with each plurality of substantially equal exposure time intervals; convertering each set of analog charges to an associated set of digital count values each having an associated noise level; and averaging each set of digital count values to an average digital representation having a second associated noise level, wherein the second associated noise level is less than the associated noise level for each set of digital count values.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 2A is an exemplary table of linear count values associated with a range of optical densities for a first exposure time interval of 1×;

FIG. 2B is an exemplary table of linear count values associated with a range of optical densities for a second exposure time interval of 20×;

FIG. 3A is an exemplary first lookup table for mapping the linear count data from FIG. 2A to logarithmic count data; and FIG. 3B is an exemplary second lookup table for mapping the linear count data from FIG. 2B to logarithmic count data.

DETAILED DESCRIPTION

Figure 1:
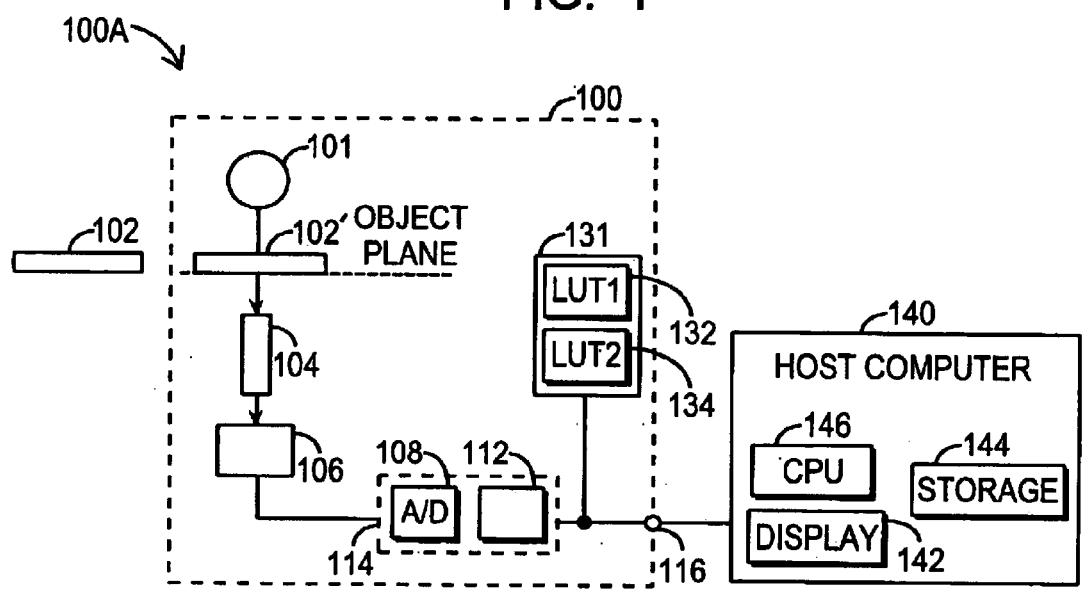
FIG. 1 is a simplified block diagram of a digitizer system consistent with the invention having a digitizer portion and host computer portion.

FIG. 1 illustrates a simplified block diagram of a digitizer system 100a consistent with the invention having a digitizer portion 100 and a host computer portion 140. The digitizer 100 generally includes an illuminator 101, a lens 104, a light sensitive element 106, and electrical processing circuitry 114 including an analog to digital converter 108 and a processor 112. The digitizer 100 may also include a machine-readable medium 131 for storing digital data such as a first lookup table 132 and a second lookup table 134 whose operation is later detailed. In general, the digitizer 100 converts optical densities of an image on a data medium 102 to electrical signals that represent various intensities of transmitted light and thus densities of the data on the applicable medium.

The data medium 102 is first located in a position 102' to be digitized. The digitizer 100 may include a transport control system (not shown) to accept the data medium 102 and drive it to the position 102' to be scanned. Alternatively, the digitizer 100 may be a flat bed type scanner where a user would position the data medium 102 in position 102' and the illuminator 101 and light sensitive element 106 would move relative to the data medium 102 while in position 102'.

The data medium 102 may be any type of medium, e.g., transparent media or reflective media. The digitizer 100 is illustrated as a digitizer for digitizing transparent media since the illuminator 101 is positioned above the object plane. However, a digitizer for digitizing reflective media may also be utilized where the illuminator would be positioned below the object plane.

Once the data medium 102 is properly positioned, a portion of light from the illuminator 101 passes through the data medium 102. The amount of light passing through the data medium depends on the transmittance or optical density of the particular image on the data medium 102 at each pixel. A lens 104 may also be used to image the light onto the light sensitive element 106.

The light sensitive element 106 accumulates photons and converts such photons into an analog electrical signal representative of the accumulated photons. The light sensitive element 106 may by a variety of elements known in the art such as a charge coupled device (CCD) array or a CMOS array. The light sensitive element 106 may be in the form of a line, square, rectangle, or any various shape such that the whole data medium 102 may be virtually divided into areas and every area corresponds to an analog signal that represents the amount of light transmitted through that area. In this manner, an analog image signal may be obtained which represents the whole image recorded on the data medium 102.

The analog image is then processed by electronic processing circuitry 114. The electronic processing circuitry 114 may include a variety of devices known in the art including the analog to digital converter 108 for converting the analog signal into a digital signal and a processor 112. As such, a digital image signal may be output to terminal 116 for further electronic use, e.g., electronic storage, processing, and communication. A host computer 140 having a variety of components known to those skilled in the art may also be coupled to the output terminal 116. Such components may include a display monitor 142 for displaying digitized data and machine-readable storage 144 for storing digital data, and its own CPU 146.

When digitizing a data medium 102 having image data with a wide range of optical densities, each line scan of the data medium 102 may be exposed to a plurality of exposures and a look up table (LUT) associated with each exposure may then be utilized as further detailed herein. Description is made to two separate exposures and two separate LUTs 132, 134, although any plurality of exposure and associated LUTs may be utilized in a digitizer consistent with the present invention. In addition, description is made herein to achieve each exposure by varying the amount of time that the light sensitive element accumulates photons. Exposures could also be made by varying the light intensity of the illuminator 101 or by other methods known in the art.

When each line of the data medium 102 is being digitized, the light sensitive element 106 may accumulate photons until an appropriate control signal instructs the light sensitive element 106 to stop accumulating photons after a predetermined time interval. Such a control signal may be provided by a variety of components known in the art such as the processor 112.

Accumulation of photons in the light sensitive element 106 may therefore occur during a first exposure time interval and a second exposure time interval, where the second time interval is greater than the first time interval, e.g., by a multiplication factor n. Since the second time interval is greater than the first time interval, such exposure is directed at those images recorded on the data medium that have a higher range of optical densities. In contrast, the first exposure is directed at those images recorded on the data medium that have a lower range of optical densities. The boundary optical density between the first lower optical density range and the higher optical density range is the Log of the multiplication factor n.

For instance, in one embodiment that multiplication factor n is 20 corresponding to a 1× exposure for the first exposure and a 20× exposure for the second exposure. The Log 20 is 1.3 such that an optical density of 1.3 is the boundary between the first lower optical density range and the second higher optical density range. With an approximate density range of 0.0 to 4.0 for the digitizer 100, the first exposure time is directed at optical densities between 0.0 and 1.3 and the second exposure time is directed at optical densities between 1.3 and 4.0. The actual time for each exposure depends on a number of factors including the characteristics of the light sensitive element 106. For instance, the 1× integration time could be on the order of 200 microseconds and the 20× integration time could be on the order of 4,000 microseconds.

Turning to FIG. 2A, an exemplary table 200A of data illustrating the various voltages and linear counts that would be obtained at various transmittance and optical densities for the first exposure (1×) is illustrated. Transmittance levels and corresponding density levels for each transmittance level are illustrated in the first two columns. The associated analog voltage and corresponding digital count value are illustrated in the next two columns.

The maximum analog voltage signal is 2.0 volts in this example, which is present if the transmittance is 1.0. The analog voltage signal is linearly reduced as the transmittance is reduced. For instance, at a transmittance of 0.05 or an OD of 1.3, the voltage signal is 0.1 volts. Assuming the analog to digital converter is a 16-bit converter, the maximum count value would be 65,536. In the exemplary table of FIG. 2A, the maximum count value was established at 64,000 for convenience. The count value would also decrease linearly with the reduction in the analog voltage signal.

Turning to FIG. 2B, an exemplary table 200B of data illustrating the various voltages and linear counts that would be obtained at various transmittance and optical densities for the second exposure (20×) is illustrated. Given the longer exposure time, the analog voltage level is saturated at 2.0 volts for those optical densities less than the boundary optical density level of 1.3 in this example. For optical densities greater than 1.3, the analog voltage signal is not saturated and the linear count data, assuming a 16-bit A/D converter and establishing the maximum count value of 64,000, ranges from 64,000 down to near zero.

Since there are now two sets of linear count data associated with each exposure, the electronic processing circuitry 114 must take the appropriate linear count data for each respective optical density level for each pixel. As illustrated in the exemplary tables 200A and 200B, the electronic processing circuitry does not have to make any comparison or selection amongst the linear count data. Rather, the electronic processing circuitry simply takes the non-saturated count data from the second exposure (corresponding to optical densities greater than 1.3 in this example) and takes the 1× linear count data for all other optical densities. As such, the darker image data at higher optical densities has linear count data based upon the longer exposure time interval.

Given this dual exposure technique, there is a greater amount of linear count data representing the higher optical density range between densities of 1.3 and 4.0. For instance, there are 64,000 counts of data for the second exposure as opposed to only 3,200 counts for the first exposure for the optical density range between 1.3 and 4.0. Corresponding LUTs for each exposure may then be utilized together with the appropriate linear count data from each exposure in order to map input count data to output count data. Each LUT may map linear input data to linear output data to produce a low noise linear output signal. Alternatively, each LUT may have a transfer function that includes a logarithmic operator in order to improve photometric resolution of the digitizer. Such exemplary LUTs 132, 134 including a logarithmic operator are further detailed herein.

The LUTs 132, 134 may be stored in any variety of machine-readable media 131, e.g., random access memory (RAM), read only memory (ROM), magnetic disk (e.g., floppy disk or hard disk drive), optical disk (e.g., CD/DVD ROM), and any other device that can store digital information. The machine-readable media 131 is part of the digitizer system 100a which may be included in the digitizer 100 as illustrated in FIG. 1 or in the host computer 140.

Details of an exemplary first LUT 130 are illustrated in FIG. 3A. In this exemplary LUT, the input data is 16-bit linear data with an established maximum linear count value of 64,000 as illustrated in the first column of the LUT. The output column of the LUT in this example is 12-bit log count data normalized to a maximum log count value of 4,000. Those skilled in the art will recognize that a variety of linear input levels and output levels may be utilized depending on the size of the A/D converter and the chosen maximum count values.

In the exemplary LUT 130 of FIG. 3A, the 12-bit log output data is given by the transfer function:

$$\text{12-bit log output} = \text{Maxlog} * [4 - \text{Log}((\text{Maxlin})/(\text{Count}))]/4 \quad (1)$$

The Maxlog value represents the selected maximum log count value depending on the number of bits needed. With a 12-bit output, the maximum count value would be 4,096 and 4,000 was selected as Maxlog to obtain the output values illustrated in FIG. 3A. Similarly, the Maxlin value is selected based on the size of A/D converter and the selected maximum value in this instance was 64,000 as previously detailed. The Count value represents the linear count value of the input. The exemplary LUT of FIG. 3a thus maps input linear count data for those optical densities between 0.0 and 1.3 to associated log count output data. Since Log (Maxlin/Count) is equal to density, and Maxlog is 4,000 in this example, equation (1) may be simplified to equation (1a) below:

$$\text{12-bit log output} = 4{,}000 * [4 - \text{Density}]/4 \quad (1a)$$

In addition, the transfer function of equation (1) may be amended to include a bias offset that is subtracted from the Maxlin and Count values. The bias offset is an intentional offset to avoid having the analog signal be a negative number since such a negative number may not be properly converted by an A/D converter.

Turning to FIG. 3B, another exemplary LUT 134 is illustrated for mapping linear count data for those optical densities between 1.3 and 4.0 in this example to output values. The LUT 134 is similar to the earlier described LUT 132 and the output data of the LUT 134 may be defined by a transfer function as detailed in equation 1. Similar to the first LUT 132, the transfer function for the second LUT 134 may be amended to include a bias offset that is subtracted from the Maxlin and Count values. A factor to account for actual exposure times may also be included and would be multiplied by the Maxlin value.

The dual exposure technique in combination with the appropriate dual LUTs enables photometric resolution of the digitized image to be improved. For instance, there are only 3,200 linear counts of data over the 2.7 density range between 1.3 and 4.0 resulting from the 1× exposure. In contrast, there are 64,000 counts of data from the second exposure for the same range of optical densities. As such, the second LUT 134 can utilize these 64,000 counts of data to improve photometric resolution over this higher optical density range since the brightness of the resulting digitized image is dependent on the number of count values.

The dual exposure and dual LUT technique also effectively serves to increase dynamic range of the digitizer by extending capabilities of the digitizer in the higher optical density range. The improvement in dynamic range is dependent on the multiplication factor n or the length of overexposure for the second exposure period. For example, when n is equal to 20, densities higher than 1.3 will have noise reduced by 95% resulting in a 1.3 density improvement in dynamic range if noise is a function of black noise only. When n is equal to 10, densities higher than 1.0 will have noise reduced by 90% resulting in a 1.0 density improvement in dynamic range if noise is a function of black noise only.

In order to reduce noise in lower optical density ranges, the multiplication factor n can be lowered thus effectively reducing the length of overexposure. For instance, a multiplication factor of 2 would result in a noise improvement for optical densities above 0.3 as opposed to noise improvements for optical densities above 1.3 when the multiplication factor is 20.

In addition, multiple sampling at 1× exposure can further reduce noise at lower optical density values and thus further improve dynamic range of the digitizer. The reduction in noise is dependent on the number of times the image can be sampled at 1× exposure. For instance, if the data medium 102 was exposed to three different exposures at a 1× time interval and the results for each exposure were averaged, the noise could be reduced for all optical densities by a factor based on the square root of 3 or an approximate noise reduction of 43%. Four samplings at 1× would result in a 50% reduction in noise. Ten samplings at 1× would result in a 68% reduction in noise.

The amount of 1× sampling should be balanced with the increased time it will take for digitizing the data medium. As light sensitive elements become more sensitive, they can be exposed to light for shorter amounts of time and hence noise can be lowered without unduly increasing scan times.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A digitizer for digitizing an image on a data medium, said digitizer comprising:

a light sensitive element configured to be responsive to a light beam from an illuminator during a first exposure and during a second exposure, said first exposure and said second exposure being produced by controlling a time that said light sensitive element is responsive to said light beam, said first exposure associated with a first range of optical densities and said second exposure associated with a second range of optical densities of said image, said light sensitive element configured to produce a first set of analog signals associated with said first exposure and a second set of analog signals associated with said second exposure;

an analog to digital converter configured to convert said first set of analog signals to a first set of digital signals and said second set of analog signals to a second set of digital signals, said first set of analog signals being produced by said light sensitive element during a first time interval that said light sensitive element is sensitive to said light beam, and second set of analog signals being produced by said light sensitive element during a second time interval that said light sensitive element is sensitive to said light beam, wherein said second time interval is greater than said first time interval by a multiplication factor n, and wherein a boundary optical density between said first range of optical densities and said second range of optical densities is equal to Log(n); and a machine-readable medium comprising a first look up table and a second look up table, wherein said first look up table is configured to map said first set of digital signals to a first set of output signals associated with said first range of optical densities, and said second look up table is configured to map said second set of digital signals to a second set of output signals associated with said second range of optical densities.

2. The digitizer of claim 1, wherein said multiplication factor n is 20 and wherein said boundary optical density is 1.3.

3. A digitizer for digitizing an image on a data medium, said digitizer comprising:

a light sensitive element configured to be responsive to a light beam from an illuminator during a first exposure and during a second exposure, said first exposure associated with a first range of optical densities and said second exposure associated with a second range of optical densities of said image, said light sensitive element configured to produce a first set of analog signals associated with said first exposure and a second set of analog signals associated with said second exposure an analog to digital converter configured to convert said first set of analog signals to a first set of digital signals and said second set of analog signals to a second set of digital signals; and a machine-readable medium comprising a first look up table and a second look up table, wherein said first look up table is configured to map said first set of digital signals to a first set of output signals associated with said first range of optical densities, and said second look un table is configured to map said second set of digital signals to a second set of output signals associated with said second range of optical densities, wherein said first look up table has a first transfer function for mapping said first set of digital signals to said first set of output signals, and wherein said second look up table has a second transfer function for mapping said second set of digital signals to said second set of output signals, wherein said first transfer function and said second transfer function comprise a logarithmic operator.

4. The digitizer of claim 3, wherein said first set of digital signals and said second set of digital signals are 16-bit signals and wherein said first set of output signals and said second set of output signals are 12-bit signals.

5. The digitizer of claim 4, wherein said first transfer function and second transfer function are given by the equation:

$$\text{output} = \text{Maxlog} * [4 - \text{Log}((\text{Maxlin})/(\text{Count}))]/4$$

wherein said output comprises one of said first set and said second set of output signals; said Maxlog comprises a predetermined maximum count value for said first set or said second set of output signals; said Maxim comprises a predetermined maximum count value for said first set or said second set of digital signals; and said Count comprises one of said first set and said second set of digital signals.

6. The digitizer of claim 5, wherein said Maxlog is 4,000 and said Maxim is 64,000.

7. A digitizer with noise reduction for low density images, said digitizer comprising:

an illuminator configured to generate a light beam to illuminate a data medium; a light sensitive element configured to be sensitive to said light beam for a plurality of approximately equal time intervals, said light sensitive element further configured to accept said light beam and convert said light beam into sets of analog signals associated with each of said plurality of time intervals representing data recorded on the data medium; an analog to digital converter configured to convert each of said sets of analog signals to an associated set of digital signals, wherein each of said sets of digital signals has an associated noise level; and a processor configured to average each of said sets of digital signals into an average digital signal having count values, said average digital signal having a second noise level, said second noise level being less than said each said associated noise level for each said set of digital signals.

8. The digitizer of claim 7, wherein said second noise level is less than said associated noise level for each said set of digital signals based on a factor dependent on a number of times said data medium is exposed to said light from said light source for said approximately equal time intervals.

9. A method of presenting data from a dual exposure technique in a digitizer, said method comprising the steps of:

exposing a data medium to a first exposure associated with a first range of optical densities and to a second exposure associated with a second range of optical densities;

accumulating a first set of analog charges associated with said first exposure and a second set of analog charges associated with said second exposure;

converting said first set of analogs charges to a first set of digital signals and converting said second set of analog charges to a second set of signals; and mapping said first set of digital signals to a first set of output signals and said second set of digital signals to a second set of output signals, wherein said mapping step comprises the step of applying a logarithmic operator.

10. A method of presenting data from a dual exposure technique in a digitizer, said method comprising the steps of:

exposing a data medium to a first exposure associated with a first range of optical densities and to a second exposure associated with a second range of optical densities;

accumulating a first set of analog charges associated with said first exposure and a second set of analog charges associated with said second exposure;

converting said first set of analog charges to a first set of digital signals and converting said second set of analog charges to a second set of signals; and mapping said first set of digital signals to a first set of output signals and said second set of digital signals to a second set of output signals, wherein said first set of digital signals and said second set of digital signals are 16-bit signals and wherein said first set of output signals and said second set of output signals are 12-bit signals.

11. The method of claim 10, wherein said mapping step comprises application of a transfer function given by the equation:

$$output = Maxlog * [4 - Log((Maxlin)/(Count))]4$$

wherein said output comprises one of said first set and said second set of output signals; said Maxlog comprises a predetermined maximum count value for said first set or said second set of output signals; said Maxim comprises a predetermined maximum count value for said first set or said second set of digital signals; and said Count comprises one of said first set and said second set of digital signals.

12. The method of claim 11, wherein said Maxlog is 4,000 and said Maxim is 64,000.

13. A method of improving photometric resolution from a dual exposure technique in a digitizer, said method comprising the steps of:

exposing a data medium to a light beam for a first exposure time interval;

accumulating a first set of analog charges associated with said first exposure time interval;

exposing said data medium to said light beam for a second exposure time interval, wherein said second exposure time interval is greater than said first exposure time interval by a multiplication factor n;

accumulating a second set of analog charges associated with said second exposure time interval;

converting said first set of analog charges to a first set of linear digital count values and converting said second set of analog charges to a second set of linear digital count values;

mapping said first set of linear digital count values corresponding to portions of said data medium having an optical density less than or equal to Log n to a first set of logarithmic digital count values; and mapping said second set of linear digital count values corresponding to portions of said data medium having an optical density greater than Log n to a second set of logarithmic digital count values.

14. A method of reducing noise for low optical density portions of a data medium, said method comprising the steps of:

exposing said data medium to a light beam for a plurality of substantially equal exposure time intervals;

accumulating a set of analog charges associated with each of said plurality of substantially equal exposure time intervals;

convertering each said set of analog charges to an associated set of digital count values each having an associated noise level; and averaging each said set of digital count values to an average digital representation having a second associated noise level, wherein said second associated noise level is less than said associated noise level for each said set of digital count values.

* * * * *

UNITED STATES PATENT AND TRADEMARK OFFICE
CERTIFICATE OF CORRECTION

PATENT NO. : 6,914,701 B2  Page 1 of 1
APPLICATION NO. : 10/313764
DATED : July 5, 2005
INVENTOR(S) : Richard Lehman It is certified that error appears in the above-identified patent and that said Letters Patent is hereby corrected as shown below:

Column 8,
Line 11, after "exposure" insert -- ; --.
Lines 44 and 50, after "said" delete "Maxim" and insert -- Maxlin --.
Line 66, after "said" delete "sets" and insert -- set --.

Column 10,
Line 8, after "said" delete "Maxim" and insert -- Maxlin --.

Signed and Sealed this

Twentieth Day of June, 2006

JON W. DUDAS
*Director of the United States Patent and Trademark Office*